(12) United States Patent
Zhang

(10) Patent No.: US 12,313,230 B2
(45) Date of Patent: May 27, 2025

(54) SKATE-BEAR-SHAPED PROJECTION LAMP

(71) Applicant: Yaqi Zhang, Jinjiang (CN)

(72) Inventor: Yaqi Zhang, Jinjiang (CN)

( * ) Notice: Subject to any disclaimer, the term of this patent is extended or adjusted under 35 U.S.C. 154(b) by 0 days.

(21) Appl. No.: 18/932,096

(22) Filed: Oct. 30, 2024

(65) Prior Publication Data
US 2025/0084973 A1    Mar. 13, 2025

(51) Int. Cl.
| | | |
|---|---|---|
| *F21S 10/00* | (2006.01) | |
| *F21V 14/02* | (2006.01) | |
| *F21V 14/08* | (2006.01) | |
| *F21W 121/00* | (2006.01) | |
| *G03B 21/14* | (2006.01) | |
| *G03B 21/20* | (2006.01) | |

(52) U.S. Cl.
CPC ............ *F21S 10/007* (2013.01); *F21V 14/02* (2013.01); *F21V 14/08* (2013.01); *G03B 21/142* (2013.01); *G03B 21/145* (2013.01); *G03B 21/2046* (2013.01); *F21W 2121/008* (2013.01)

(58) Field of Classification Search
CPC ...... F21S 10/007; F21S 10/026; F21S 10/023; F21S 10/063; G03B 21/142
See application file for complete search history.

(56) References Cited

U.S. PATENT DOCUMENTS

| | | | | |
|---|---|---|---|---|
| 11,281,083 | B1* | 3/2022 | Xin | G03B 21/145 |
| 12,181,129 | B1* | 12/2024 | Wang | F21V 23/04 |
| 2014/0063813 | A1 | 3/2014 | Chen et al. | |
| 2014/0146517 | A1* | 5/2014 | Ng | F21V 29/70 |
| | | | | 362/84 |
| 2021/0364142 | A1* | 11/2021 | Zheng | F21V 3/049 |
| 2021/0381666 | A1* | 12/2021 | Zheng | F21V 5/005 |
| 2023/0194070 | A1* | 6/2023 | Wu | F21V 3/049 |
| | | | | 362/311.01 |
| 2024/0053664 | A1 | 2/2024 | Shu | |

* cited by examiner

*Primary Examiner* — Alexander K Garlen
(74) *Attorney, Agent, or Firm* — Hemisphere Law, PLLC; Zhigang Ma

(57) ABSTRACT

The present disclosure discloses a skate-bear-shaped projection lamp, and relates to the technical field of projection lamps. The skate-bear-shaped projection lamp includes a projection head portion; a lower body of the skate bear is movably connected to the projection head portion; a center column, a lower end of which is fixedly connected to an inner cavity of the lower body of the skate bear, is mounted in a center inside the projection head portion; an inner annular picture plate and an outer annular picture plate which are adjusted in any angle for combined projection surround an upper end of the center column in sequence from inside to outside; an inner ring plate and an outer ring plate which are capable of being adjusted in any angle are respectively fixed at upper ends of the inner annular picture plate and the outer annular picture plate.

8 Claims, 12 Drawing Sheets

SKATE-BEAR-SHAPED PROJECTION LAMP

TECHNICAL FIELD

The present disclosure relates to the technical field of projection, and in particular, to a skate-bear-shaped projection lamp.

BACKGROUND

At present, on the market, there are many special projection lamps that imitate the appearances of animals, such as skate-bear-shaped projection lamps, mainly used for home decoration or used as toys for children. By projecting different pictures and backgrounds, special visual effects are presented to arouse children's interest or to achieve arrangements of some environmental atmospheres. In terms of the arrangement of the environmental atmospheres, the existing projection lamps can achieve ideal effects, and different projection pictures can be replaced as needed. However, there are still shortcomings in use of the projection lamps as the toys for children, specifically as follows:

A card insertion method for picture projection is used in most of the existing projection lamps. The principle is that light that is emitted by a light source passes through an inverted projection picture and is finally projected out after being magnified by a convex lens and inverted for the second time. Projection pictures are generally switched by inserting cards. Generally, inserting one picture can only project one image. Switching projection images can only achieved by replacing new pictures. For the skate-bear-shaped projection lamp, a projection region is provided at a head portion, and the head portion is connected to a body in a rotatable manner within an angle range. To replace a picture, the head portion needs to be removed and the lamp is opened through a hole in a lower end or by dividing the head portion into two parts from a center of the head portion. The operation process is complex. Meanwhile, repeated mounting and removal can easily cause moving components of the projection lamp to become insensitive or be damaged. Secondly, the number of picture combinations projected by the existing projection lamp is limited. For example, an animal can only correspond to several scenes, and the arrangement and combination of several objects and backgrounds can be achieved only. In addition, from the psychological perspective, according to the conclusion proved by experimental observation, the brief visual experience caused by the complex operation will make children lose interest.

In response to the above issues, there is an urgent need for an innovative design based on the original skate-bear-shaped projection lamp.

SUMMARY

The technical solution of the present disclosure provides a solution that is significantly different from the prior art to solve the technical problems that the solution in the prior art is too simple. Specifically, the present disclosure aims to provide a skate-bear-shaped projection lamp, to solve the following problems mentioned in the background section: The number of picture combinations projected by the existing projection lamp is limited. For example, an animal can only correspond to several scenes, and the arrangement and combination of several objects and backgrounds can be achieved only. In addition, from the psychological perspective, according to the conclusion proved by experimental observation, the brief visual experience caused by the complex operation will make children lose interest.

To achieve the above objectives, the present disclosure provides the following technical solution: A skate-bear-shaped projection lamp includes a projection head portion; a lower body of the skate bear is movably connected to the projection head portion; a center column, a lower end of which is fixedly connected to an inner cavity of the lower body of the skate bear, is mounted in a center inside the projection head portion; an inner annular picture plate and an outer annular picture plate which are adjusted in any angle for combined projection are arranged around an upper end of the center column in sequence from inside to outside; an inner ring plate and an outer ring plate which are capable of being adjusted in any angle are respectively fixed at upper ends of the inner annular picture plate and the outer annular picture plate; an inner toothed ring and an outer toothed ring which are reversely arranged are respectively mounted at upper ends of the inner ring plate and the outer ring plate; a rotary adjustment assembly is mounted between each of the inner toothed ring and the outer toothed ring, and the projection head portion;

a dynamic aurora light source mechanism and a top projection lamp are respectively arranged on one side of the center column from bottom to top; the top projection lamp is fixedly connected to the center column; the dynamic aurora light source mechanism is fixedly connected to screw holes on an inner back side of the projection head portion through screws on two sides; and the dynamic aurora light source mechanism uses a variable light source that imitates flow of aurora.

Preferably, an aurora projection panel corresponding to the dynamic aurora light source mechanism is arranged at a face position of the projection head portion; a background projection path corresponding to the top projection lamp is provided in a top of the projection head portion; and the center column is located in a gap between a back side of the dynamic aurora light source mechanism and the projection head portion.

Preferably, pressing rods are fixed at an upper end of the center column at equal angles; a first annular slot is provided in an inner wall of the inner ring plate; and outer ends of the pressing rods are located inside the first annular slot.

Preferably, the rotary adjustment assembly at the upper end of the inner ring plate and the rotary adjustment assembly at the upper end of the outer ring plate are reversely arranged.

Preferably, an outer wall of the inner ring plate abuts against an inner wall of the outer ring plate; a second annular slot is provided in the inner wall of the outer ring plate; one end of a connecting block is arranged in the second annular slot at an equal angle; and the other end of the connecting block is fixed on the outer wall of the inner ring plate.

Preferably, each rotary adjustment assembly includes fixed sleeves, rotating rods, sliding chutes, clamping plates, and one-way resisting plates; the one-way resisting plates are arranged on outer walls of both the inner toothed ring and the outer toothed ring at equal angles; the rotating rods are fixed on upper surfaces of outer ends of the one-way resisting plates; upper ends of the rotating rods are connected with the fixed sleeves that are fixed on an inner wall of the projection head portion; the upper ends of the rotating rods are rotatably arranged in the fixed sleeves; the sliding chutes are provided in inner walls of the fixed sleeves at equal angles; one ends of the clamping plates are slidably arranged in the sliding chutes in a snap-in manner; and the other ends of the clamping plates are fixed on outer walls of the rotating rods.

Preferably, the one-way resisting plate on the outer wall of the inner toothed ring and the one-way resisting plate on the outer wall of the outer toothed ring are reversely arranged; and the two one-way resisting plates are in collision connection with oblique slots on outer walls of both the inner toothed ring and the outer toothed ring.

Preferably, the outer walls of the rotating rods are wound with vortex springs; inner ends of the vortex springs are fixed on the outer walls of the rotating rods; and outer ends of the vortex springs are welded on the inner walls of the fixed sleeves.

Compared with the prior art, the present disclosure has the beneficial effects below:

An angle adjustment mode for the inner annular picture plate and the outer annular picture plate is as follows: The projection head portion is rotated clockwise. The projection head portion will drive the several groups of fixed sleeves, rotating rods, and one-way resisting plates to synchronously rotate clockwise. When the one-way resisting plate abutting against the inner toothed ring rotates clockwise, since oblique teeth of the inner toothed ring do not collide with the one-way resisting plate that rotates clockwise, the one-way resisting plate may periodically rotate in a bouncing manner outside the inner toothed ring. Under the pushing action of a tooth block of the inner toothed ring, an inner side of the one-way resisting plate may push the one-way resisting plate and the rotating rods to adaptively rotate inside the fixed sleeves and compress the vortex springs. When the projection head portion is rotated clockwise, the one-way resisting plate that rotates synchronously clockwise outside the outer toothed ring may cause a hard pressing and pushing action on the outer toothed ring, so that the outer toothed ring may drive the outer ring plate to synchronously rotate clockwise outside the inner ring plate. When the outer ring plate rotates clockwise, the outer ring plate may synchronously drive the outer annular picture plate at the lower end to rotate clockwise, but the inner annular picture plate on the inner side remains stationary. At this time, projection combination images are switched. When the projection head portion is rotated anticlockwise, the outer annular picture plate on the outer side remains stationary in the same way, and the inner annular picture plate on the inner side may synchronously rotate anticlockwise along with the inner toothed ring. At this time, the projection combination images are switched again. Thus, arrangement and switching of inner and outer projection combinations can be achieved. Furthermore, the projection combination images will not be repeated no matter how to rotate the projection head portion, clockwise or anticlockwise. There are several kinds of combinations available.

For example, if an image corresponding to the inner annular picture plate is an automobile, and an image corresponding to the outer annular picture plate is a road, a formed projection is the automobile running on the road. After the outer annular picture plate is rotated, the image on the outer annular picture plate is changed to a brook, and the projection combination is changed to the automobile crossing the brook. For another example, after the inner annular picture plate is rotated, the image corresponding to the inner annular picture plate is changed to a horse, and the image on the outer annular picture plate is still the brook. The projection image is the horse running in the brook. Alternatively, the image corresponding to the outer annular picture plate includes a brook and a road, and a formed combined projection image is the horse running between the brook and the road. In this way, the inner annular picture plate and the outer annular picture plate can form various combinations after angle adjustment and change, and these combinations will not be repeated. Compared with an existing replacement mode for inserting cards for replacement, the present disclosure is simpler and more convenient. Furthermore, frequent removal of the projection head portion to replace pictures is not required. Projection images inside the projection head portion can be combined without limitation. As a toy for children, the skate-bear-shaped projection lamp has a stronger sense of technology.

Figure 1:
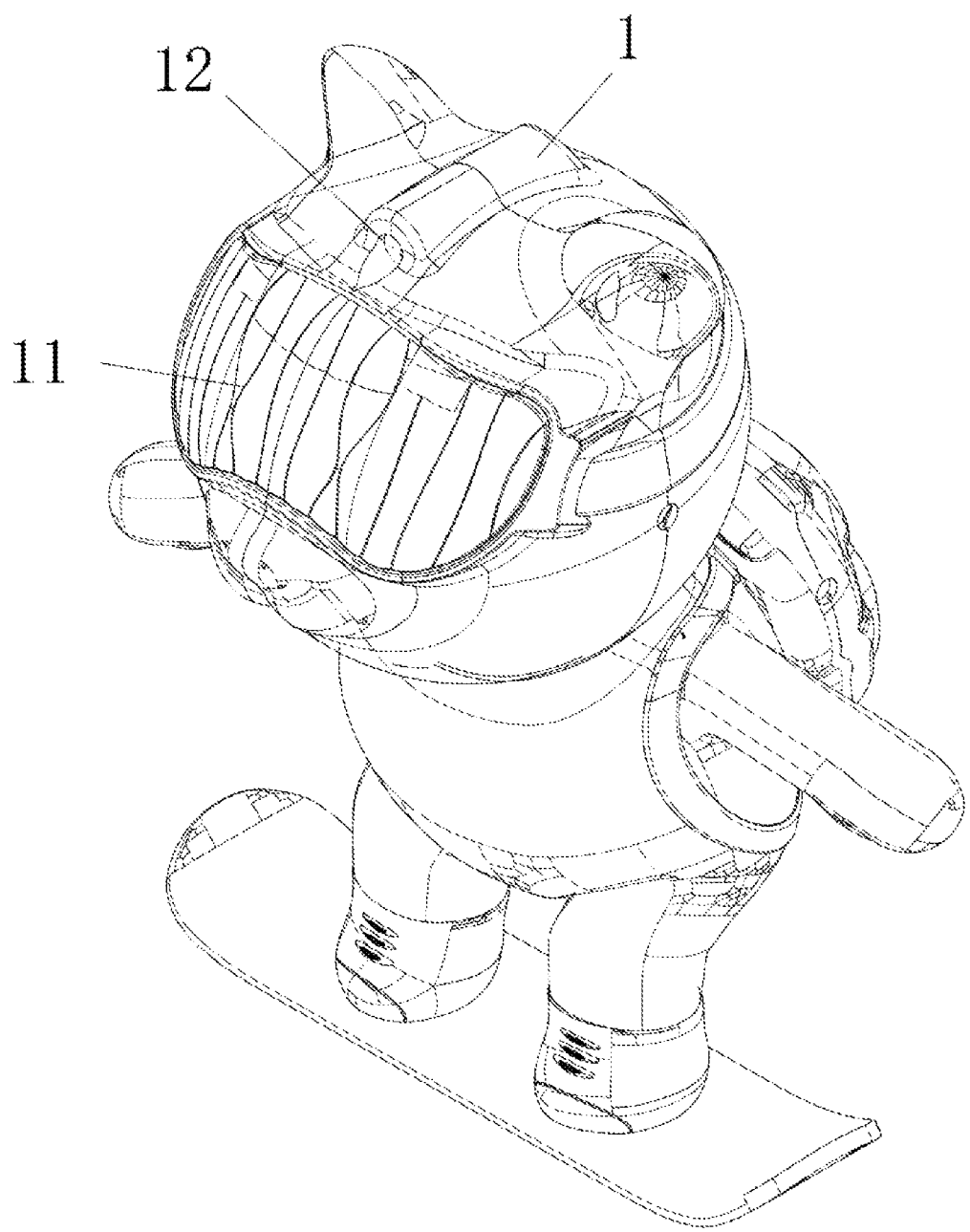
FIG. 1 is a schematic diagram of a first three-dimensional structure according to the present disclosure.
Figure 2:
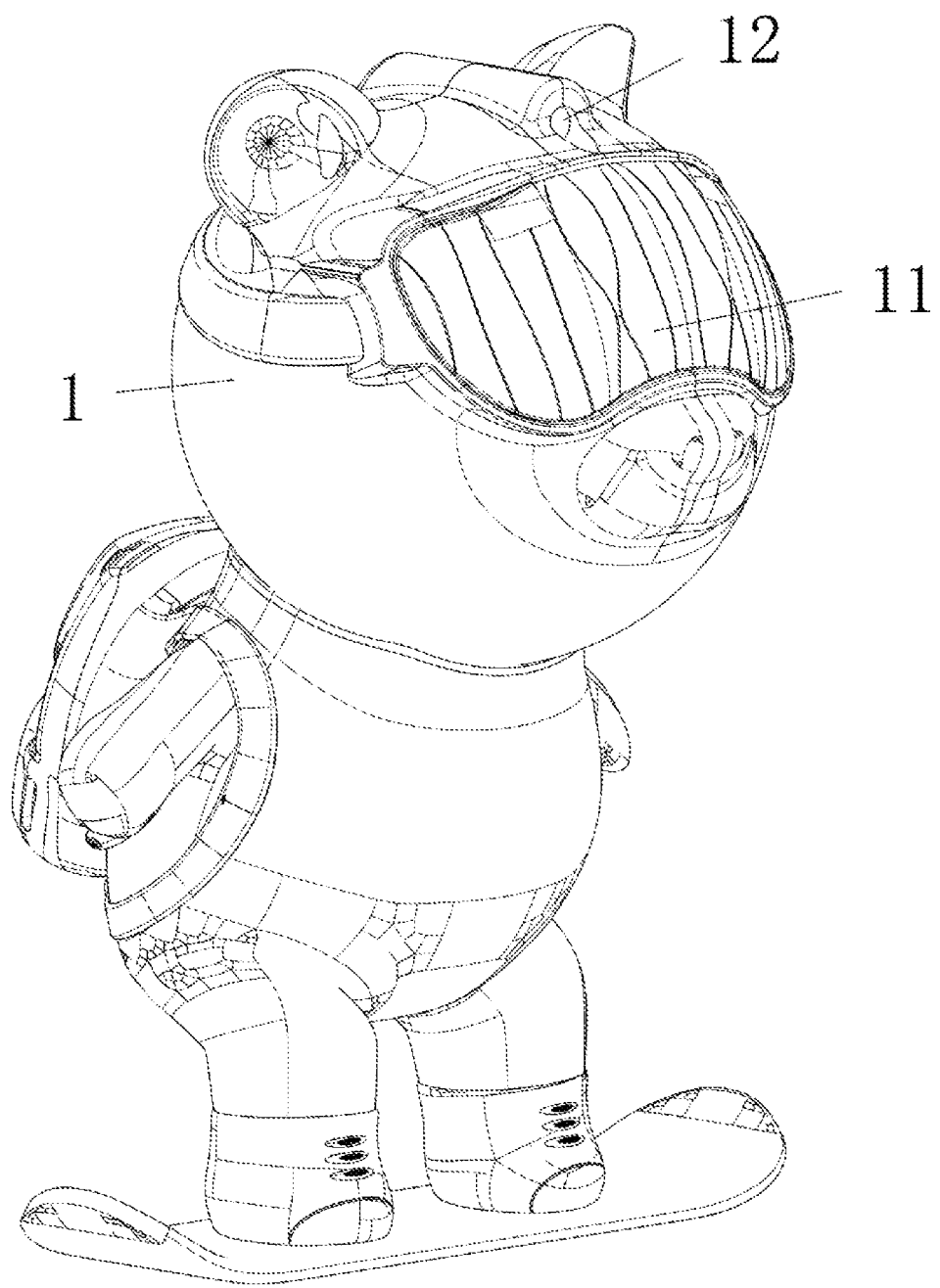
FIG. 2 is a schematic diagram of a second three-dimensional structure according to the present disclosure.
Figure 3:
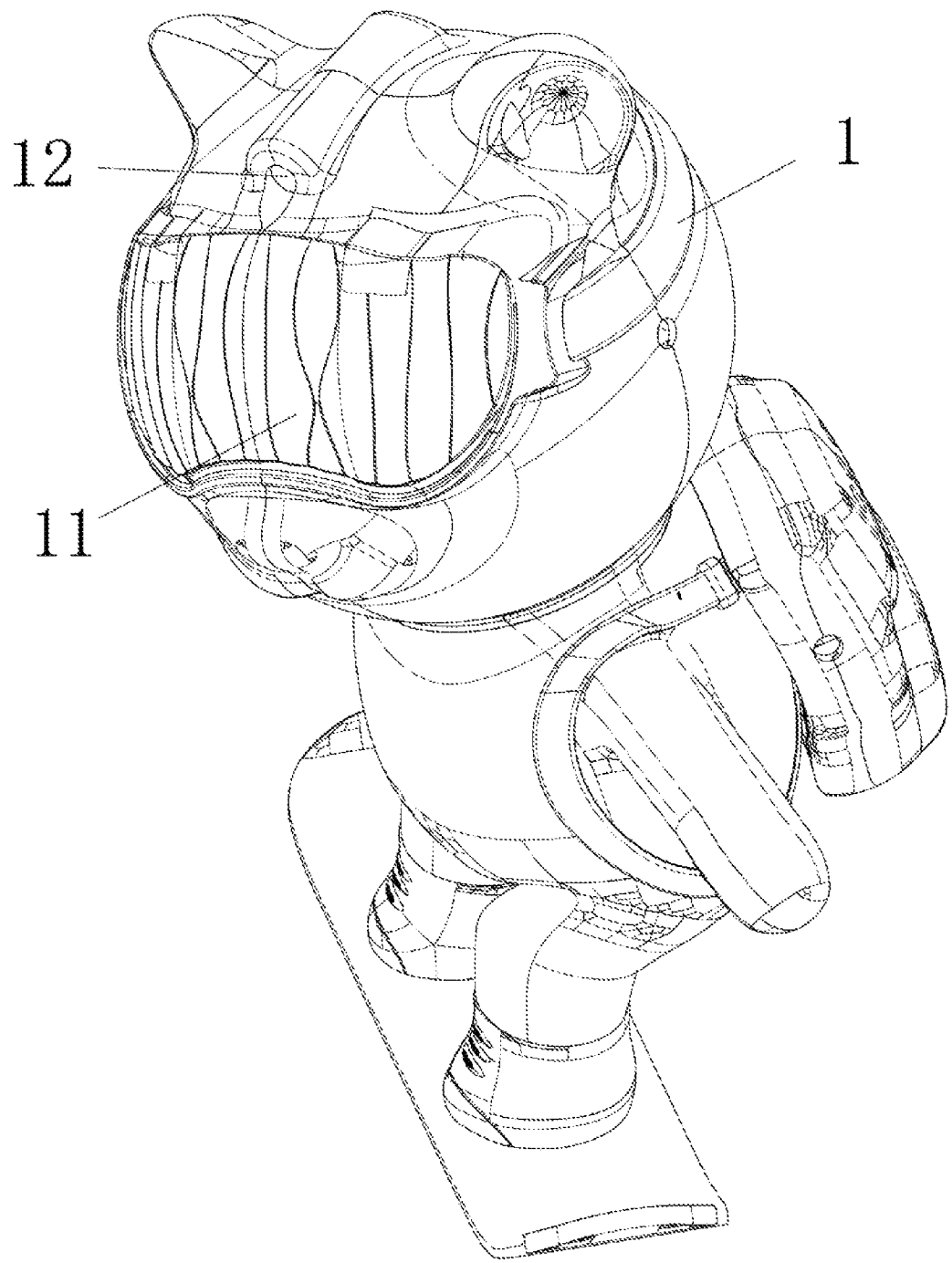
FIG. 3 is a schematic diagram of a third three-dimensional structure according to the present disclosure.
Figure 4:
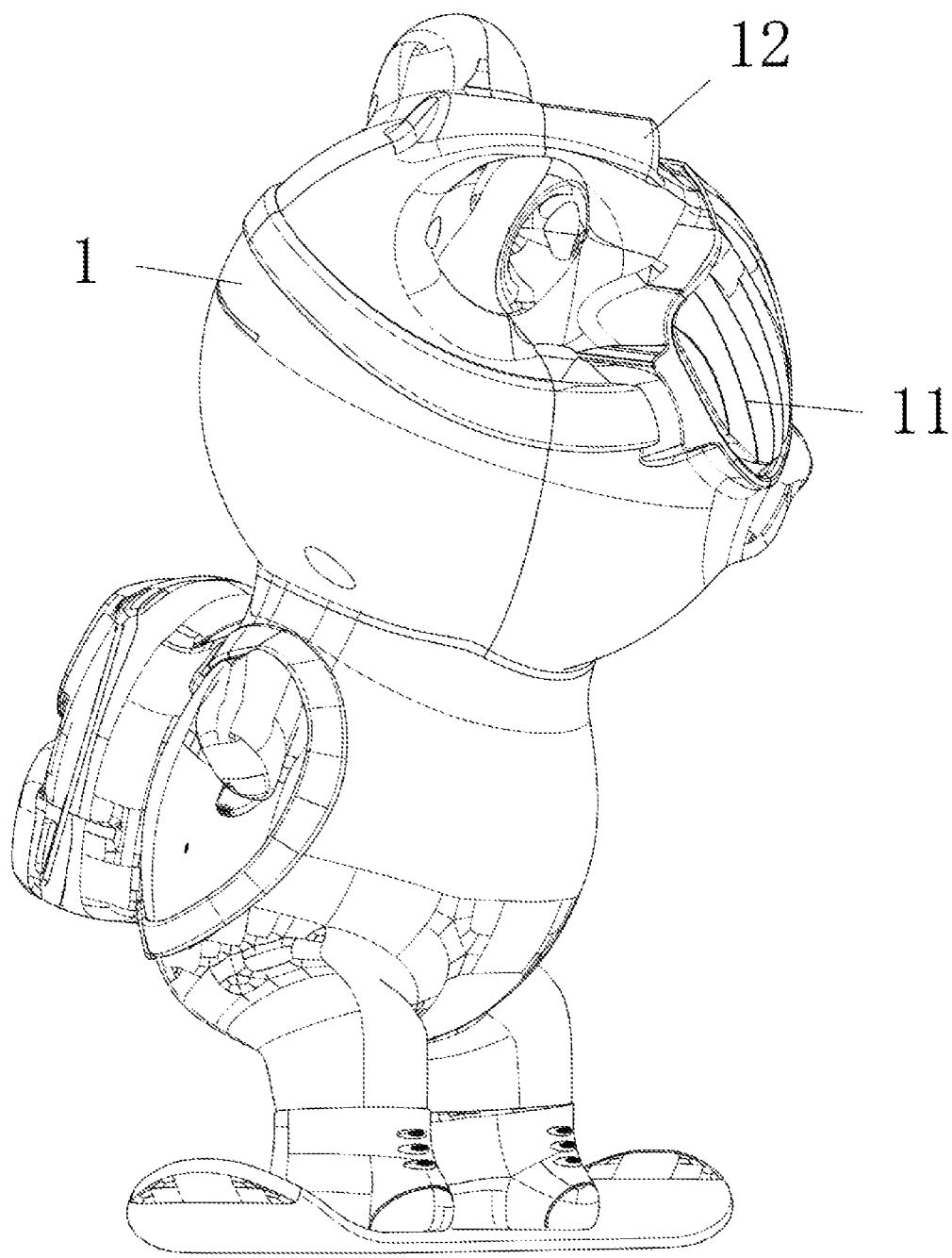
FIG. 4 is a schematic diagram of a fourth three-dimensional structure according to the present disclosure.

In the drawings: 1: projection head portion; 11: aurora projection panel; 12: background projection path; 14: dynamic aurora light source mechanism; 2: center column; 21: pressing rod; 22: first annular slot; 3: inner ring plate; 31: inner toothed ring; 4: outer ring plate; 41: outer toothed ring; 5: connecting block; 51: second annular slot; 6: fixed sleeve; 61: rotating rod; 62: vortex spring; 63: sliding chute; 64: clamping plate; 7: one-way resisting plate; 8: inner annular picture plate; and 9: outer annular picture plate.

DETAILED DESCRIPTION OF THE EMBODIMENTS

The technical solutions in the embodiments of the present disclosure will be clearly and completely described below with reference to the drawings in the embodiments of the present disclosure, and it is obvious that the described embodiments are only a part of the embodiments of the present disclosure but not all of them. All other embodiments obtained by a person of ordinary skill in the art based on the embodiments of present disclosure without making creative efforts shall fall within the protection scope of present disclosure.

Referring to FIG. 1 to FIG. 12, the present disclosure provides a technical solution: A skate-bear-shaped projection lamp includes a projection head portion 1; a lower body of the skate bear is movably connected to the projection head portion 1; a center column 2, a lower end of which is fixedly connected to an inner cavity of the lower body of the skate bear, is mounted in a center inside the projection head portion 1; an inner annular picture plate 8 and an outer annular picture plate 9 which are adjusted in any angle for combined projection are arranged around an upper end of the center column 2 in sequence from inside to outside; an inner ring plate 3 and an outer ring plate 4 which are capable of being adjusted in any angle are respectively fixed at upper ends of the inner annular picture plate 8 and the outer annular picture plate 9; an inner toothed ring 31 and an outer toothed ring 41 which are reversely arranged are respectively mounted at upper ends of the inner ring plate 3 and the outer ring plate 4; a rotary adjustment assembly is mounted between each of the inner toothed ring 31 and the outer toothed ring 41, and the projection head portion 1;

a dynamic aurora light source mechanism 14 and a top projection lamp are respectively arranged on one side of the center column 2 from bottom to top; the top projection lamp is fixedly connected to the center column 2; the dynamic aurora light source mechanism 14 is fixedly connected to screw holes on an inner back side of the projection head portion 1 through screws on two sides; and the dynamic aurora light source mechanism 14 uses a variable light source that imitates flow of aurora.

An aurora projection panel 11 corresponding to the dynamic aurora light source mechanism 14 is arranged at a face position of the projection head portion 1; a background projection path 12 corresponding to the top projection lamp is provided in a top of the projection head portion 1; and the center column 2 is located in a gap between a back side of the dynamic aurora light source mechanism 14 and the projection head portion 1.

Pressing rods 21 are fixed at an upper end of the center column 2 at equal angles; a first annular slot 22 is provided in an inner wall of the inner ring plate 3; and outer ends of the pressing rods 21 are located inside the first annular slot 22.

The rotary adjustment assembly at the upper end of the inner ring plate 3 and the rotary adjustment assembly at the upper end of the outer ring plate 4 are reversely arranged.

An outer wall of the inner ring plate 3 abuts against an inner wall of the outer ring plate 4; a second annular slot 51 is provided in the inner wall of the outer ring plate 4; one end of a connecting block 5 is arranged in the second annular slot 51 at an equal angle; and the other end of the connecting block 5 is fixed on the outer wall of the inner ring plate 3.

Each rotary adjustment assembly includes fixed sleeves 6, rotating rods 61, sliding chutes 63, clamping plates 64, and one-way resisting plates 7; the one-way resisting plates 7 are arranged on outer walls of both the inner toothed ring 31 and the outer toothed ring 41 at equal angles; the rotating rods 61 are fixed on upper surfaces of outer ends of the one-way resisting plates 7; upper ends of the rotating rods 61 are connected with the fixed sleeves 6 that are fixed on an inner wall of the projection head portion 1; the upper ends of the rotating rods 61 are rotatably arranged in the fixed sleeves 6; the sliding chutes 63 are provided in inner walls of the fixed sleeves 6 at equal angles; one ends of the clamping plates 64 are slidably arranged in the sliding chutes 63 in a snap-in manner; and the other ends of the clamping plates 64 are fixed on outer walls of the rotating rods 61.

The one-way resisting plate 7 on the outer wall of the inner toothed ring 31 and the one-way resisting plate 7 on the outer wall of the outer toothed ring 41 are reversely arranged; and the two one-way resisting plates 7 are respectively in collision connection with oblique slots on outer walls of both the inner toothed ring 31 and the outer toothed ring 41.

The outer walls of the rotating rods 61 are wound with vortex springs 62; inner ends of the vortex springs 62 are fixed on the outer walls of the rotating rods 61; and outer ends of the vortex springs 62 are welded on the inner walls of the fixed sleeves 6.

Figure 5:
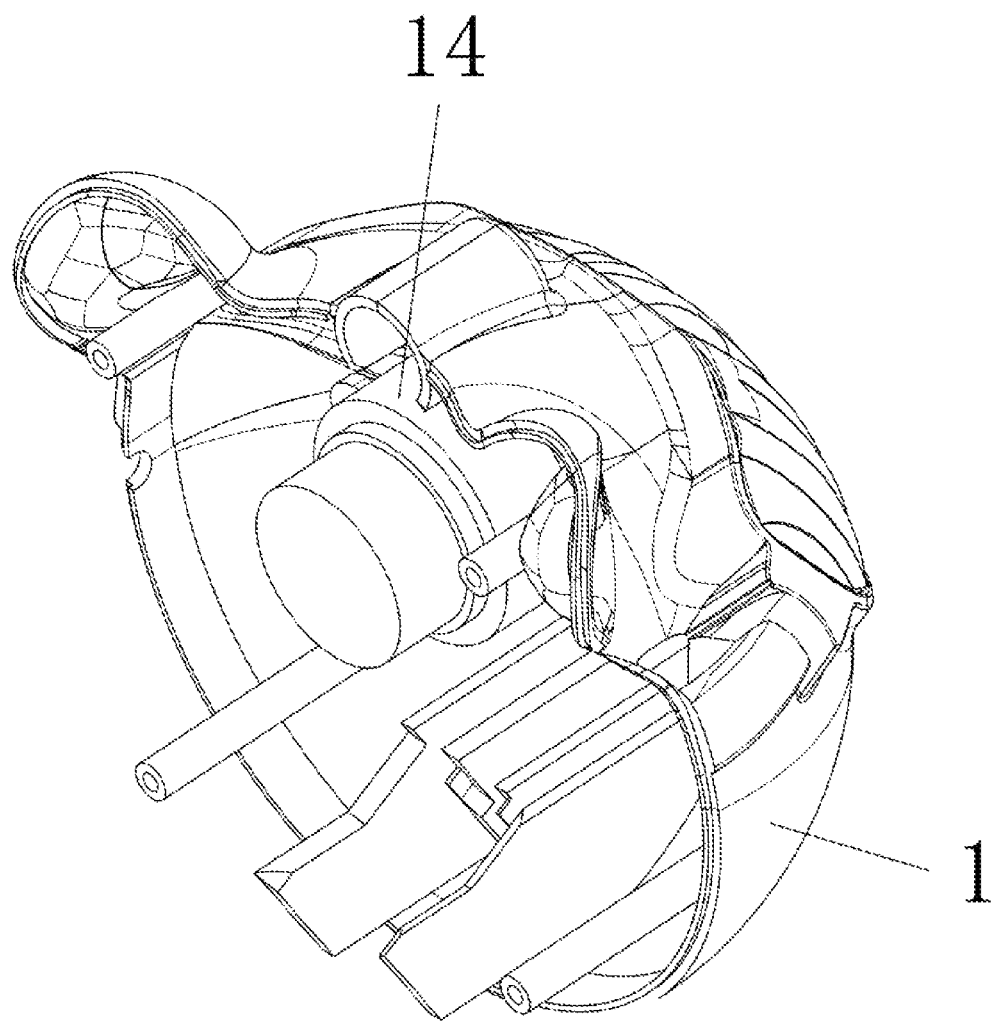
FIG. 5 is a schematic diagram of a three-dimensional structure after a projection head portion is divided in half according to the present disclosure.
Figure 6:
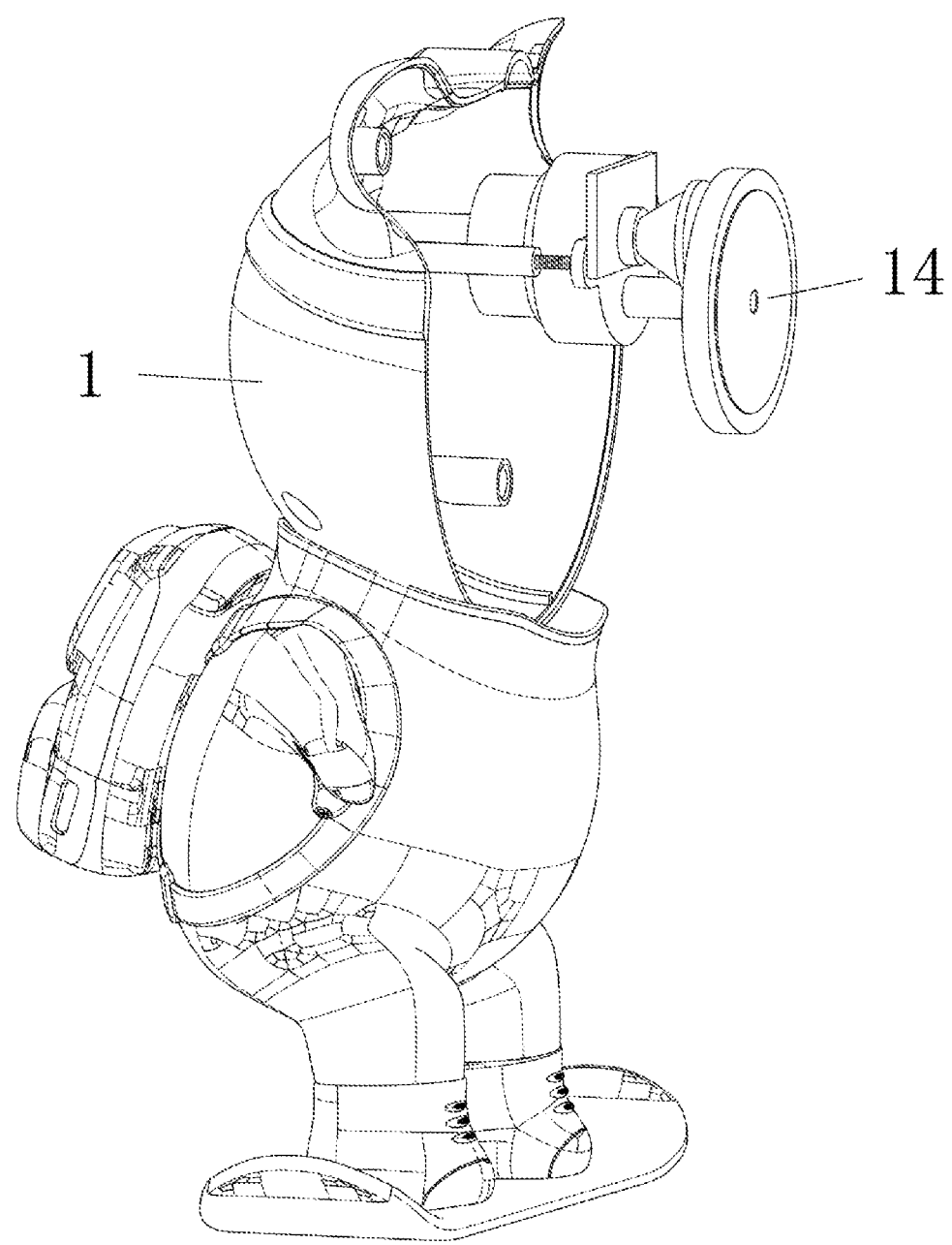
FIG. 6 is a diagram of a connection relationship between a dynamic aurora light source mechanism and a projection head portion.
Figure 7:
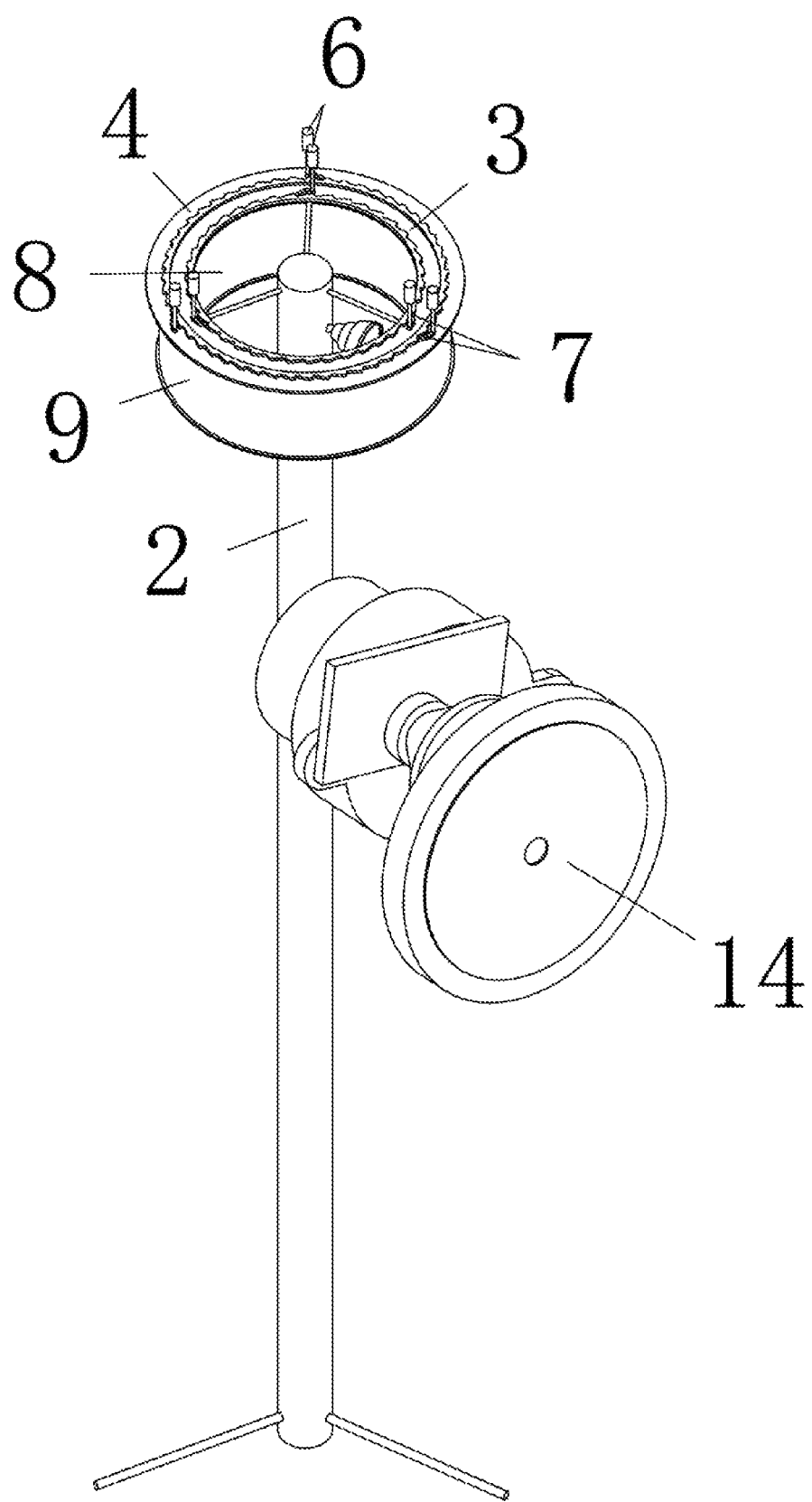
FIG. 7 is a schematic diagram of an internal structure of a projection head portion according to the present disclosure.

The working principle is as follows: When the skate-bear-shaped projection lamp is used, as shown in FIG. 5, FIG. 6, and FIG. 7, the aurora projection panel 11 corresponding to the dynamic aurora light source mechanism 14 is arranged at the face position of the projection head portion 1; and the background projection path 12 corresponding to the top projection lamp is provided in a top of the projection head portion 1. When the dynamic aurora light source mechanism 14 and the top projection lamp are turned on, after light is emitted from a gap in the aurora projection panel 11 and is magnified and imaged, an aurora wall is formed. The top projection lamp located in the inner annular picture plate 8 and the outer annular picture plate 9 may overlap images on the inner annular picture plate 8 and the outer annular picture plate 9 at corresponding angles and project the images through the background projection path 12.

Embodiment: For example, if an image corresponding to the inner annular picture plate 8 is an automobile, and an image corresponding to the outer annular picture plate 9 is a road, a formed projection is the automobile running on the road. After the outer annular picture plate 9 is rotated, the image on the outer annular picture plate 9 is changed to a brook, and the projection combination is changed to the automobile crossing the brook. For another example, after the inner annular picture plate 8 is rotated, the image corresponding to the inner annular picture plate 8 is changed to a horse, and the image on the outer annular picture plate 9 is still the brook. The projection image is the horse running in the brook. Alternatively, the image corresponding to the outer annular picture plate 9 includes a brook and a road, and a formed combined projection image is the horse running between the brook and the road, thereby achieving unordered arrangement and combination. The inner annular picture plate 8 and the outer annular picture plate 9 can form various combinations after angle adjustment and change.

Figure 8:
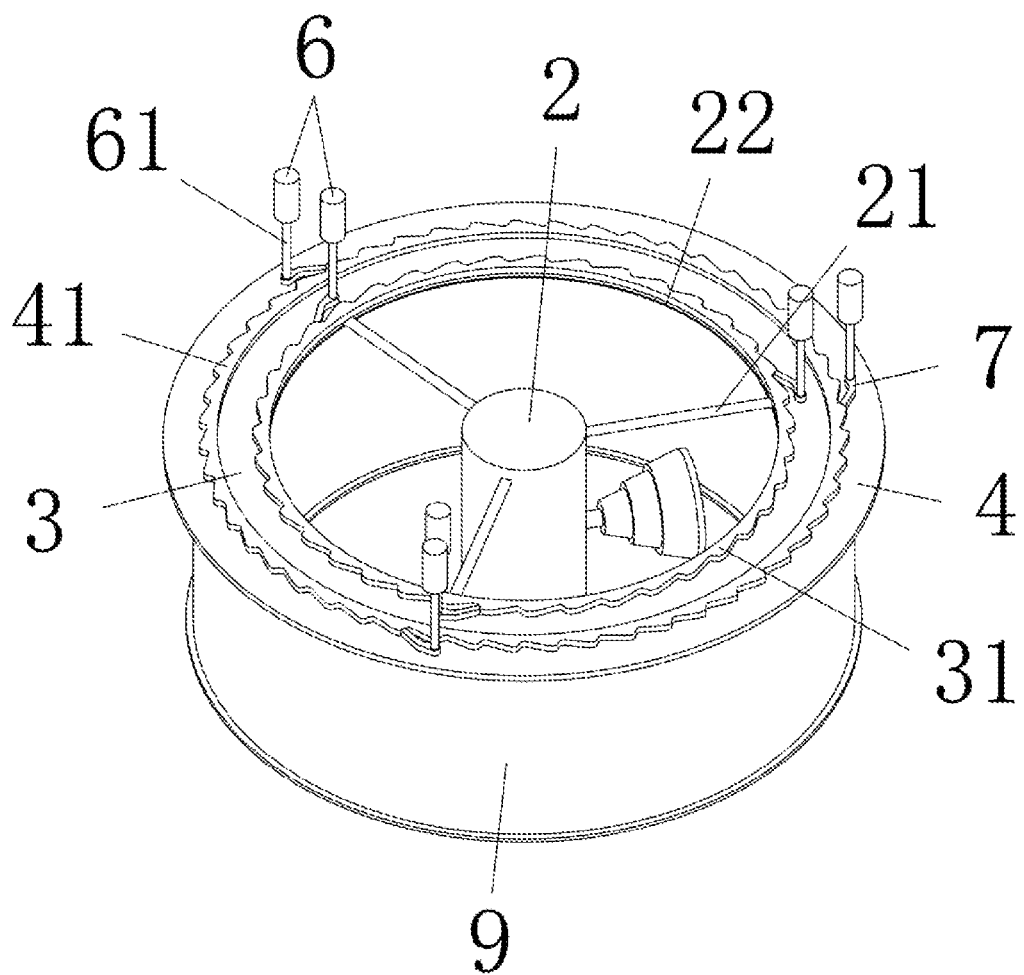
FIG. 8 is a schematic diagram of a mounting structure of an inner annular picture plate and an outer annular picture plate according to the present disclosure.
Figure 9:
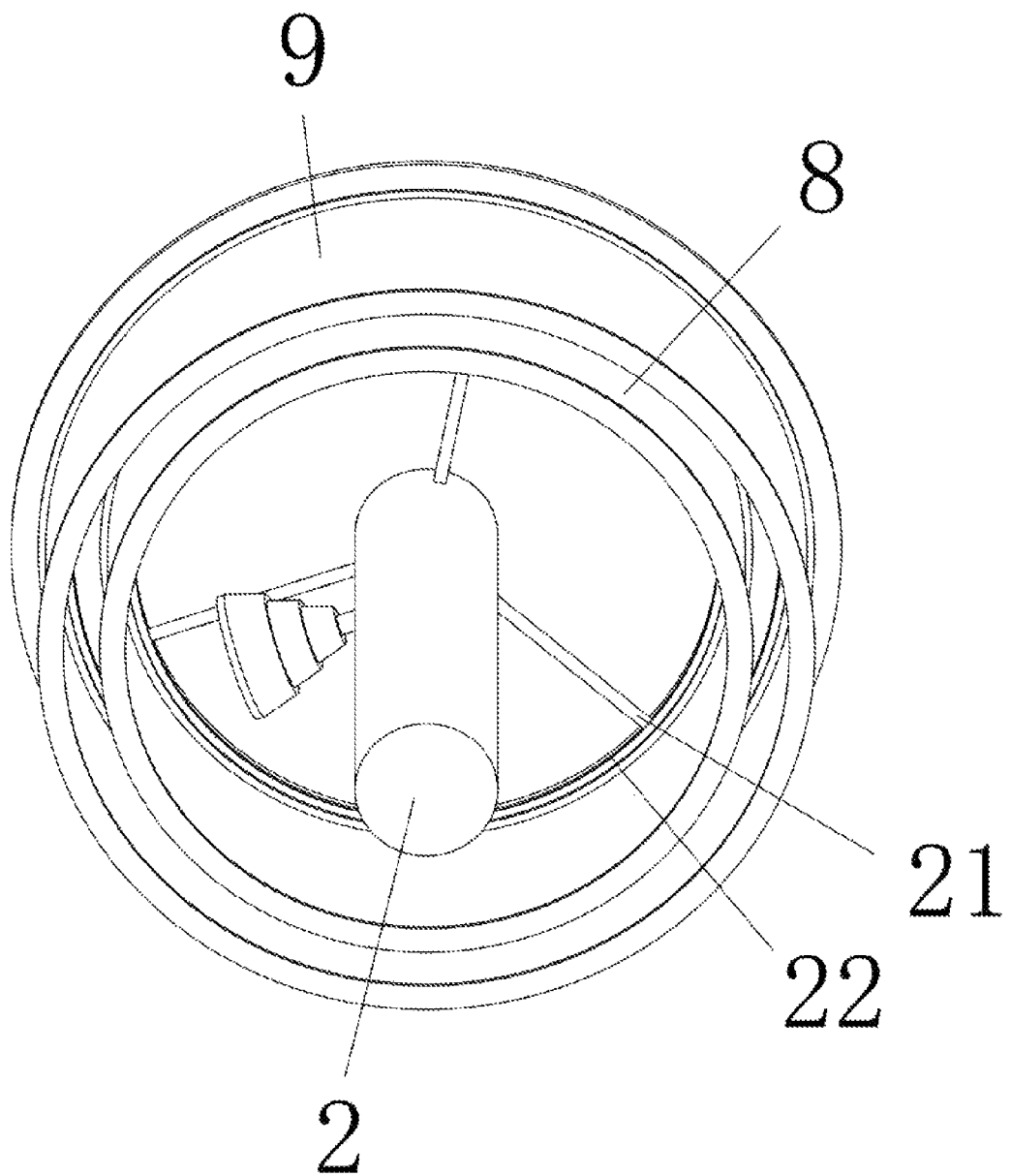
FIG. 9 is a schematic diagram of a bottom-view structure of an inner annular picture plate and an outer annular picture plate according to the present disclosure.
Figure 10:
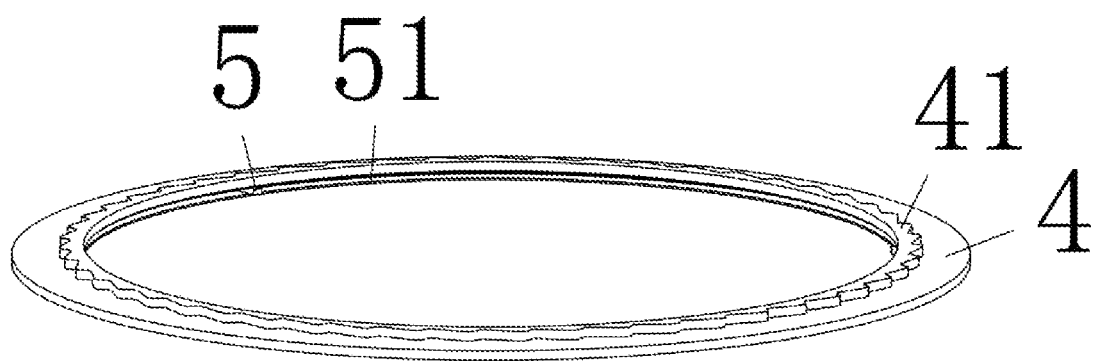
FIG. 10 is a schematic diagram of a three-dimensional structure of an outer ring plate according to the present disclosure.
Figure 11:
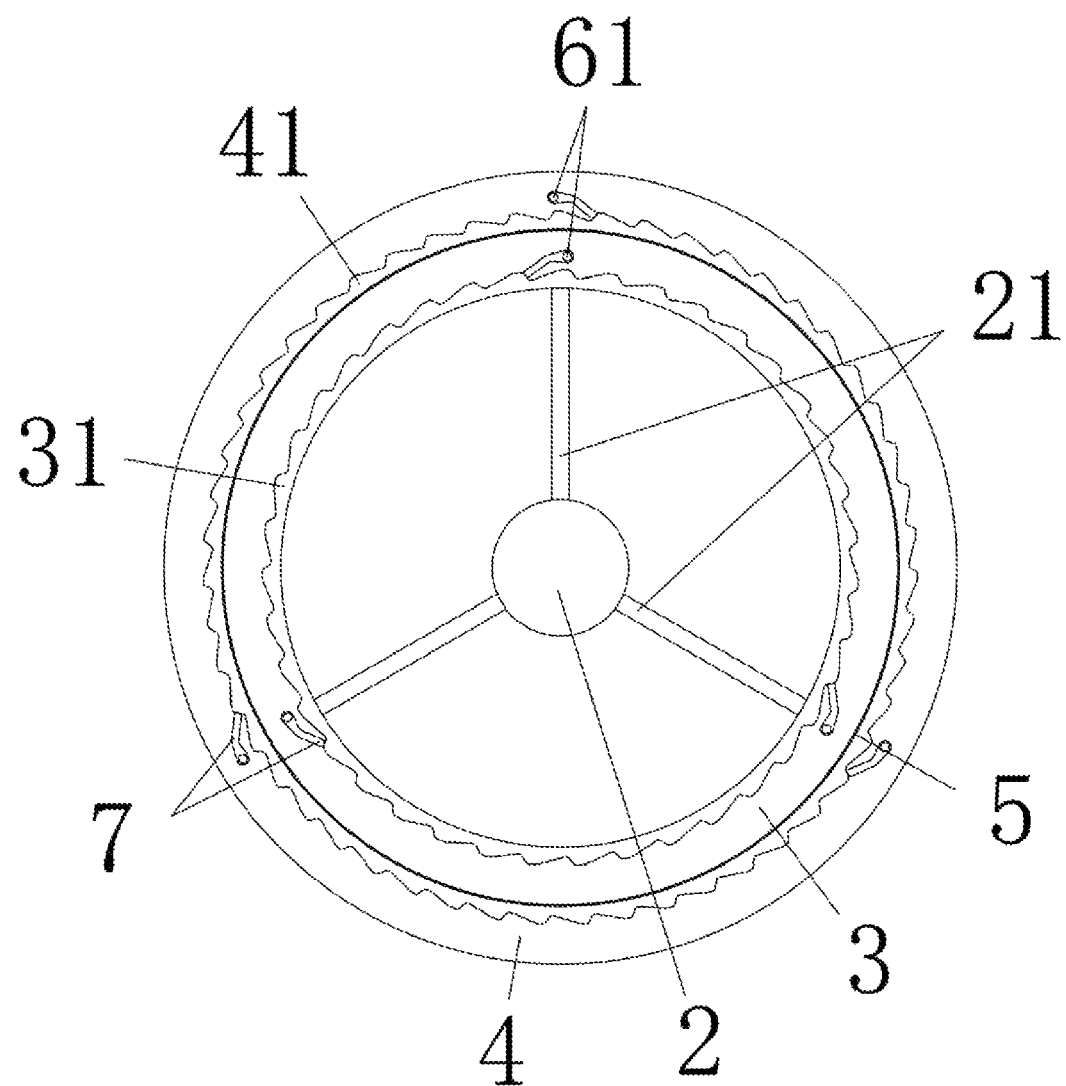
FIG. 11 is a schematic diagram of a top-view mounting structure of an inner annular picture plate and an outer annular picture plate according to the present disclosure.
Figure 12:
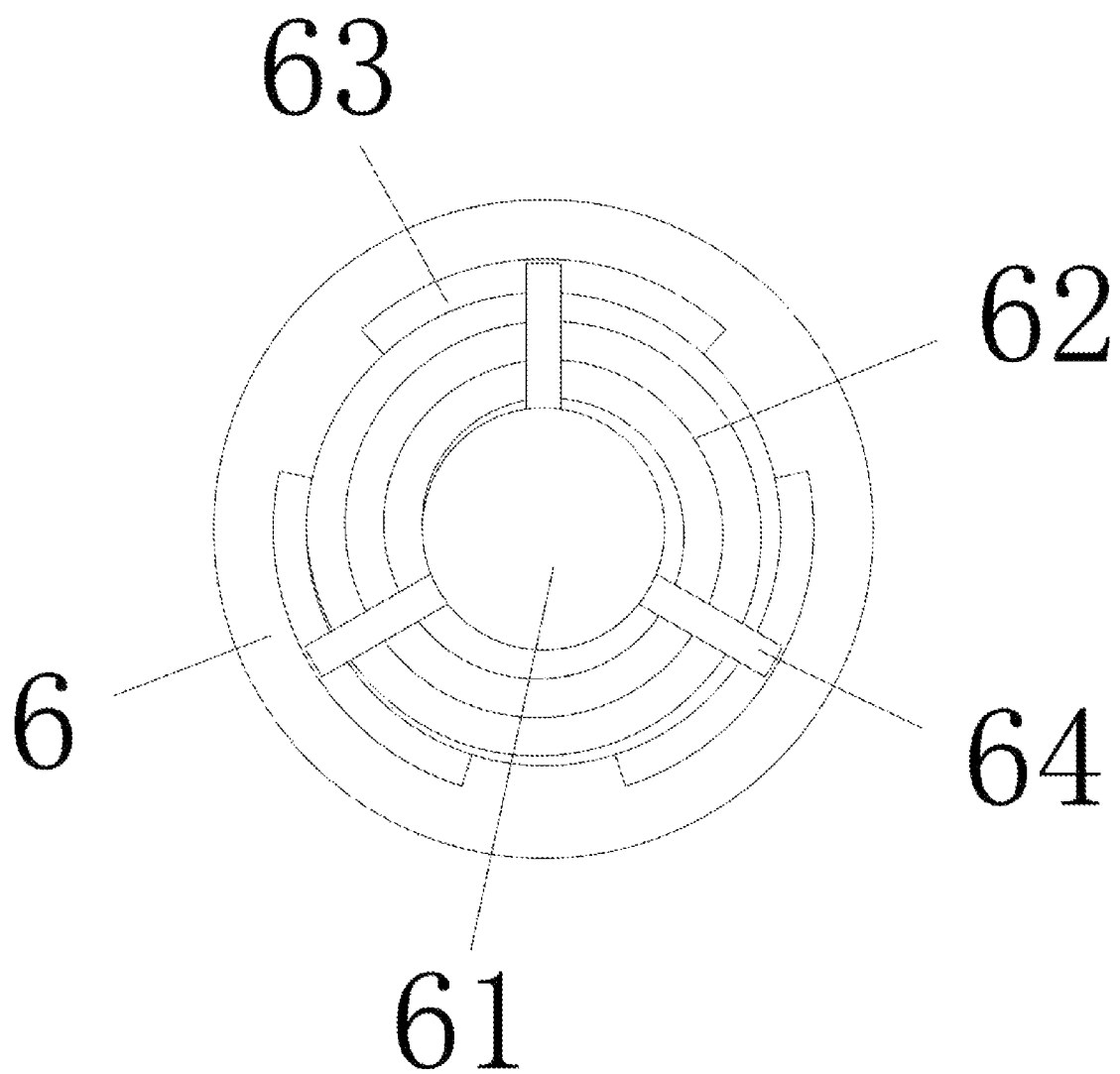
FIG. 12 is a schematic structural diagram of connection between rotating rods and fixed sleeves according to the present disclosure.

An angle adjustment mode for the inner annular picture plate 8 and the outer annular picture plate 9 is as follows: As shown in FIG. 7, FIG. 8, and FIG. 9, the projection head portion 1 is rotated clockwise. The projection head portion 1 will drive the several groups of fixed sleeves 6, rotating rods 61, and one-way resisting plates 7 to synchronously rotate clockwise. When the one-way resisting plate 7 abutting against the inner toothed ring 31 rotates clockwise, since oblique teeth of the inner toothed ring 31 do not collide with the one-way resisting plate 7 that rotates clockwise, the one-way resisting plate 7 may periodically rotate in a bouncing manner outside the inner toothed ring 31. Under the pushing action of a tooth block of the inner toothed ring 31, an inner side of the one-way resisting plate 7 may push the one-way resisting plate 7 and the rotating rods 61 to adaptively rotate inside the fixed sleeves 6 and compress the vortex springs 62. When the projection head portion 1 is rotated clockwise, the one-way resisting plate 7 that rotates synchronously clockwise outside the outer toothed ring 41 may cause a hard pressing and pushing action on the outer toothed ring 41, so that the outer toothed ring 41 may drive the outer ring plate 4 to synchronously rotate clockwise outside the inner ring plate 3. When the outer ring plate 4 rotates clockwise, the outer ring plate may synchronously drive the outer annular picture plate 9 at the lower end to rotate clockwise, but the inner annular picture plate 8 on the inner side remains stationary. At this time, projection combination images are switched. When the projection head portion 1 is rotated anticlockwise, the outer annular picture plate 9 on the outer side remains stationary in the same way, and the inner annular picture plate 8 on the inner side may synchronously rotate anticlockwise along with the inner toothed ring 31. At this time, the projection combination images are switched again. Thus, arrangement and switching of inner and outer projection combinations can be achieved. Furthermore, the projection combination images will not be repeated no matter how to rotate the projection head portion 1, clockwise or anticlockwise.

Although the present disclosure is described in detail with reference to the foregoing embodiments, a person skilled in the art may still make modifications to the technical solutions described in the foregoing respective embodiments or make equivalent replacements to partial technical features thereof. Any modification, equivalent replacement, improvement, and the like made within the spirit and principle of the present disclosure shall fall within the protection scope of the present disclosure.

What is claimed is:

1. A skate-bear-shaped projection lamp, comprising a projection head portion (1), wherein a lower body of the skate bear is movably connected to the projection head portion (1); a center column (2), a lower end of which is fixedly connected to an inner cavity of the lower body of the skate bear, is mounted in a center inside the projection head portion (1); an inner annular picture plate (8) and an outer annular picture plate (9) which are adjusted in any angle for combined projection are arranged around an upper end of the center column (2) in sequence from inside to outside; an inner ring plate (3) and an outer ring plate (4) which are capable of being adjusted in any angle are respectively fixed at upper ends of the inner annular picture plate (8) and the outer annular picture plate (9); an inner toothed ring (31) and an outer toothed ring (41) which are reversely arranged are respectively mounted at upper ends of the inner ring plate (3) and the outer ring plate (4); a rotary adjustment assembly is mounted between each of the inner toothed ring (31) and the outer toothed ring (41), and the projection head portion (1);
 a dynamic aurora light source mechanism (14) and a top projection lamp are respectively arranged on one side of the center column (2) from bottom to top; the top projection lamp is fixedly connected to the center column (2); the dynamic aurora light source mechanism (14) is fixedly connected to screw holes on an inner back side of the projection head portion (1) through screws on two sides; and
 the dynamic aurora light source mechanism (14) uses a variable light source that imitates flow of aurora.

2. The skate-bear-shaped projection lamp according to claim 1, wherein an aurora projection panel (11) corresponding to the dynamic aurora light source mechanism (14) is arranged at a face position of the projection head portion (1); a background projection path (12) corresponding to the top projection lamp is provided in a top of the projection head portion (1); and the center column (2) is located in a gap between a back side of the dynamic aurora light source mechanism (14) and the projection head portion (1).

3. The skate-bear-shaped projection lamp according to claim 1, wherein pressing rods (21) are fixed at an upper end of the center column (2) at equal angles; a first annular slot (22) is provided in an inner wall of the inner ring plate (3); and outer ends of the pressing rods (21) are located inside the first annular slot (22).

4. The skate-bear-shaped projection lamp according to claim 1, wherein the rotary adjustment assembly at the upper end of the inner ring plate (3) and the rotary adjustment assembly at the upper end of the outer ring plate (4) are reversely arranged.

5. The skate-bear-shaped projection lamp according to claim 1, wherein an outer wall of the inner ring plate (3) abuts against an inner wall of the outer ring plate (4); a second annular slot (51) is provided in the inner wall of the outer ring plate (4); one end of a connecting block (5) is arranged in the second annular slot (51) at an equal angle; and the other end of the connecting block (5) is fixed on the outer wall of the inner ring plate (3).

6. The skate-bear-shaped projection lamp according to claim 1, wherein each rotary adjustment assembly comprises fixed sleeves (6), rotating rods (61), sliding chutes (63), clamping plates (64), and one-way resisting plates (7); the one-way resisting plates (7) are arranged on outer walls of both the inner toothed ring (31) and the outer toothed ring (41) at equal angles; the rotating rods (61) are fixed on upper surfaces of outer ends of the one-way resisting plates (7); upper ends of the rotating rods (61) are connected with the fixed sleeves (6) that are fixed on an inner wall of the projection head portion (1); the upper ends of the rotating rods (61) are rotatably arranged in the fixed sleeves (6); the sliding chutes (63) are provided in inner walls of the fixed sleeves (6) at equal angles; one ends of the clamping plates (64) are slidably arranged in the sliding chutes (63) in a snap-in manner; and the other ends of the clamping plates (64) are fixed on outer walls of the rotating rods (61).

7. The skate-bear-shaped projection lamp according to claim 6, wherein the one-way resisting plate (7) on the outer wall of the inner toothed ring (31) and the one-way resisting plate (7) on the outer wall of the outer toothed ring (41) are reversely arranged; and the two one-way resisting plates (7) are in collision connection with oblique slots on outer walls of both the inner toothed ring (31) and the outer toothed ring (41).

8. The skate-bear-shaped projection lamp according to claim 6, wherein the outer walls of the rotating rods (61) are wound with vortex springs (62); inner ends of the vortex springs (62) are fixed on the outer walls of the rotating rods (61); and outer ends of the vortex springs (62) are welded on the inner walls of the fixed sleeves (6).

* * * * *